US008239349B2

(12) United States Patent
Castellanos et al.

(10) Patent No.: US 8,239,349 B2
(45) Date of Patent: Aug. 7, 2012

(54) EXTRACTING DATA

(75) Inventors: Maria G. Castellanos, Sunnyvale, CA (US); Miguel Durazo, Sonora (MX); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 149 days.

(21) Appl. No.: 12/900,133

(22) Filed: Oct. 7, 2010

(65) Prior Publication Data

US 2012/0089620 A1  Apr. 12, 2012

(51) Int. Cl.
*G06F 17/30* (2006.01)

(52) U.S. Cl. ........ 707/674; 707/610; 707/640; 707/661; 707/687; 707/705

(58) Field of Classification Search ........... 707/600–831
See application file for complete search history.

(56) References Cited

U.S. PATENT DOCUMENTS

| | | | |
|---|---|---|---|
| 5,608,904 A | 3/1997 | Chaudhuri et al. | |
| 5,694,591 A | 12/1997 | Du et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,940,839 A | 8/1999 | Chen et al. | |
| 6,377,287 B1 | 4/2002 | Hao et al. | |
| 6,466,946 B1 | 10/2002 | Mishra et al. | |
| 6,502,091 B1 | 12/2002 | Chundi et al. | |
| 6,515,740 B2 | 2/2003 | Bamji et al. | |
| 6,553,385 B2 | 4/2003 | Johnson et al. | |
| 6,584,433 B1 | 6/2003 | Zhang et al. | |
| 6,658,358 B2 | 12/2003 | Hao et al. | |
| 6,684,206 B2 | 1/2004 | Chen et al. | |
| 6,728,932 B1 | 4/2004 | Chundi et al. | |
| 6,845,380 B2 | 1/2005 | Su et al. | |
| 6,897,885 B1 | 5/2005 | Hao et al. | |
| 6,912,555 B2 | 6/2005 | Lemon et al. | |
| 6,917,940 B1 | 7/2005 | Chen et al. | |
| 6,937,238 B2 | 8/2005 | Hao et al. | |
| 6,978,275 B2 | 12/2005 | Castellanos et al. | |

(Continued)

FOREIGN PATENT DOCUMENTS

EP  1959354 A2  8/2008

OTHER PUBLICATIONS

Mooney, Raymond J., et al., "Text Mining with Information Extraction," Proceedings of the 4th International MIDP Colloquium, Sep. 2003, Bloemfontein, South Africa, Daelemans, W., du Plessis, T., Snyman, C. and Teck, L. (Eds.), pp. 141-160, Van Schaik Publishers, South Africa, 2005, Available at http://userweb.cs.utexas.edu/users/ml/papers/discotex-melm-03.pdf, (last accessed on Jan. 10, 2011).

(Continued)

*Primary Examiner* — Isaac M Woo (57) ABSTRACT

Information can be extracted from unstructured documents using embodiments described herein. An entity recognition may be performed on an unstructured document and found entities may be annotated. Annotating includes inserting tags around the found entities to generate marked entities. A rule is applied to each of the marked entities in the unstructured document to generate a confidence value for every marked entity, wherein the rule comprises a plurality of prefixes for a target entity and a plurality of suffixes for the target entity. A marked entity with the highest confidence value is selected as an extraction target.

20 Claims, 5 Drawing Sheets

U.S. PATENT DOCUMENTS

| | | | |
|---|---|---|---|
| 6,983,395 B2 | 1/2006 | Chen et al. | |
| 7,003,725 B2 | 2/2006 | Castellanos et al. | |
| 7,007,020 B1 | 2/2006 | Chen et al. | |
| 7,046,247 B2 | 5/2006 | Hao et al. | |
| 7,076,474 B2 | 7/2006 | Jin et al. | |
| 7,139,752 B2 * | 11/2006 | Broder et al. | 1/1 |
| 7,146,359 B2 | 12/2006 | Castellanos | |
| 7,171,406 B2 | 1/2007 | Chen et al. | |
| 7,181,678 B2 | 2/2007 | Chundi et al. | |
| 7,202,868 B2 | 4/2007 | Hao et al. | |
| 7,221,474 B2 | 5/2007 | Hao et al. | |
| 7,363,306 B1 | 4/2008 | Hao et al. | |
| 7,403,985 B2 | 7/2008 | Casati et al. | |
| 7,428,486 B1 | 9/2008 | Casati et al. | |
| 7,467,145 B1 | 12/2008 | Castellanos et al. | |
| 7,483,940 B2 | 1/2009 | Chen et al. | |
| 7,505,967 B2 | 3/2009 | Casati et al. | |
| 7,529,762 B2 | 5/2009 | Casati et al. | |
| 7,565,304 B2 | 7/2009 | Casati et al. | |
| 7,567,250 B2 | 7/2009 | Hao et al. | |
| 7,643,029 B2 | 1/2010 | Hao et al. | |
| 7,714,876 B1 | 5/2010 | Hao et al. | |
| 7,716,227 B1 | 5/2010 | Hao et al. | |
| 7,760,203 B1 | 7/2010 | Hao et al. | |
| 7,761,444 B2 | 7/2010 | Zhang et al. | |
| 7,761,455 B2 | 7/2010 | Shan et al. | |
| 7,779,344 B1 | 8/2010 | Hao et al. | |
| 7,788,064 B1 | 8/2010 | Hao et al. | |
| 7,797,341 B2 | 9/2010 | Castellanos et al. | |
| 2005/0108630 A1 | 5/2005 | Wasson et al. | |
| 2006/0059439 A1 | 3/2006 | Hao et al. | |
| 2006/0095858 A1 | 5/2006 | Hao et al. | |
| 2009/0125542 A1 | 5/2009 | Loeser et al. | |

OTHER PUBLICATIONS

"TIES (Trainable Information Extraction System)," Available at http://tcc.itc.it/research/textec/tools-resources/ties.html, (last accessed on Apr. 9, 2010).

* cited by examiner

EXTRACTING DATA

BACKGROUND

One important use for computer systems is data mining, in other words, discovering, and condensing information from various sources. During the information retrieval, data mining may be used to identify trends, to improve operating efficiency, and extract information from disparate sources, such as unstructured documents. Information extraction (IE) is a type of information retrieval whose goal is to automatically extract and structure information from unstructured documents. After extraction the information may be structured by being categorized and contextually and semantically well-defined. Thus, the information may be manipulated and managed as any other structured data.

BRIEF DESCRIPTION OF THE DRAWINGS

Examples of embodiments are described in the following detailed description and in reference to the drawings, in which.

DETAILED DESCRIPTION

One example of information extraction is provided by the extraction of instances of corporate mergers from an online news sources. The corporate merger may be formally shown as MergerBetween(company1, company2, date), which may be populated by extracting information from a sentence in an article, such as: "Company1 announced that their acquisition of company 2 will be finalized on date." A broad goal of IE is to allow computation to be done on the previously unstructured data. The significance of IE is determined by the growing amount of information available in unstructured form, for example, on the Internet. This knowledge can be made more accessible by means of transformation into a structured from such as relational form or by marking with XML tags. An intelligent agent monitoring a news data feed requires IE to transform unstructured data into something that can be used for reasoning.

Embodiments provide an efficient tool for extracting specific information from a document, using a rule derived from a genetic algorithm. For each document in which a specific type of information is desired, a contextual search algorithm is performed, marking each instance of a targeted type of word, such as a company name or a date. A second search algorithm applies a set of contextual rules to each of the marked occurrences to identify a specific type of word, such as a name of a customer company, or a contract expiration date.

Overview

Figure 1:
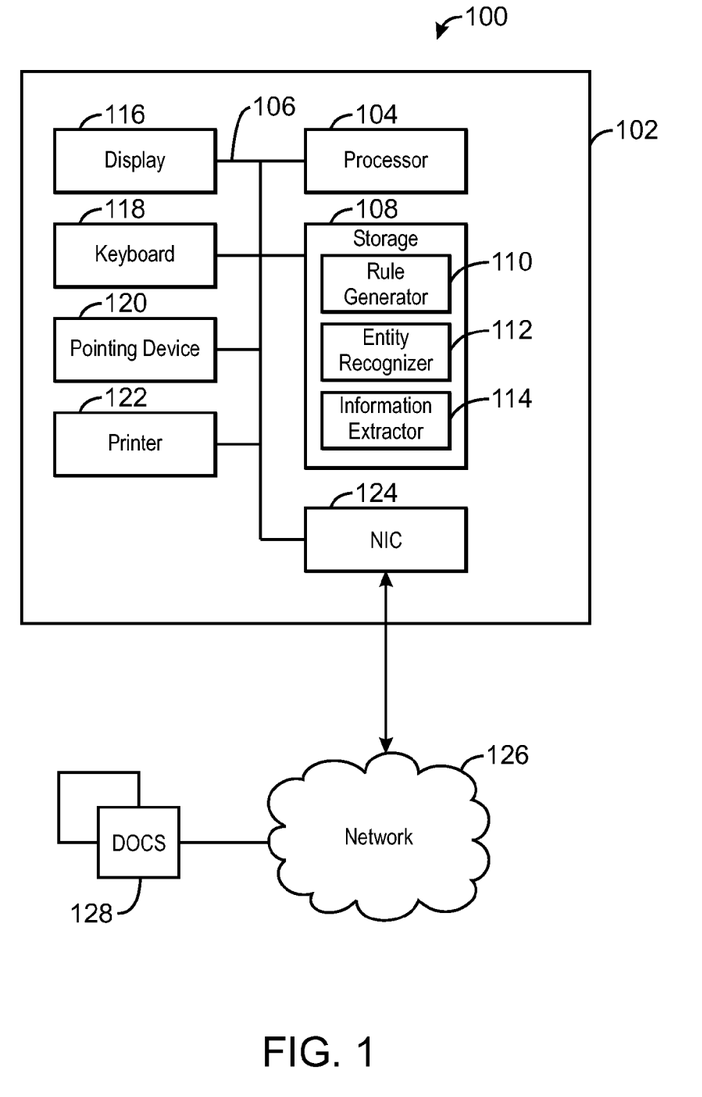
FIG. 1 is a block diagram of a system in which a target entity may be extracted from an unstructured document, in accordance with an embodiment.

FIG. 1 is a block diagram of a system 100 in which a target entity may be extracted from an unstructured document, in accordance with an embodiment. As used herein, the target entity, or entity of interest, is a specific piece of information in a document, such as a person name, a company name, a date, an expiration date, a start date, or a time period, among others. There are two kinds of entities, basic entities, such as a person's name, a date, or a company name, and role-based entities, such as an expiration date, or a customer name. A role-based entity is a basic entity with a specific role. For example, from all the names of people in a document, only one is the customer name, that is, that person name has the role of a customer. Various embodiments can identify role-based entities in unstructured documents. A target entity is a desired piece of information, such as any of the items listed above. Our focus is on the role-based ones, which can be much harder to identify. The system 100 may include a computing unit 102 that has a number of subunits that provide functionality. The subunits include a processor 104 that may communicate with other subunits over a bus 106.

The processor 104 may be a single processing core, a multiple processing core, or a cluster of processors. The bus 106 may be of any type of communication, such as PCI, PCIe, ISA, EISA, Ethernet, and the like. The bus 106 may allow the processor 104 to communicate with a storage system 108. The storage system 108 may include any combinations of non-transitory, computer-readable media that can be used to hold data and code for processing tasks. For example, the storage system 108 can include any combinations of random access memory (RAM), read-only memory (ROM), hard drives, optical drives, RAM drives, and the like. To implement the functions discussed herein, the storage system 108 may include various code modules, such as a rule generator 110, an entity recognizer 112, and an information extractor 114, among others. The embodiments are not limited to these code arrangements, as any number of systems and arrangements may be used, including hardware units, software modules, or any combinations thereof.

A number of subunits may be included in the computing device 102 to facilitate various functions, such as interfacing with a user. These units may include input and output devices, such as a display 116, a keyboard 118, and a pointing device 120. The display 116 may include a single display or multiple displays, and may be located on a networked computer accessing the processor 104 and storage system 108 in a cluster computing arrangement. The keyboard 118 and pointing device 120 may include any number of devices for obtaining input from a user, including keyboards, keypads, mice, trackballs, touch pads, touch screens, digitizing tablets, virtual reality systems, and the like. A printer 122 may be used to obtain physical copies of output from the modules 110, 112, and 114.

The computing device 102 may include a network interface card (NIC) 124 that may provide access to information over a network 126. The network 126 may include a local area network (LAN), a wide area network (WAN), the Internet, or any combinations thereof. For example, the network 126 may provide access to a source 128 of unstructured documents, such as a storage system or a website, among others.

One approach to extracting information from a given domain is to build extraction rules containing clues as conditions to find the information piece which the action part of the rule extracts. The clues often adopt the form of patterns. When there is regularity in the patterns and the number of patterns is small, patterns can be discovered manually and encoded in a regular expression. However, there may be substantial variability in the patterns or there may be many different patterns, which can complicate the extraction. To overcome this situation, machine learning approaches may automatically learn models that capture regularities in the context of information instances. In some models the rules are rigid in that the condition has to be fully satisfied for the extraction to take place, while in other models the rules are more flexible and allow room for some variability.

In some embodiments, patterns of prefixes and suffixes are used as indicators of the occurrence of an instance of the target entity. Although the approach uses rules, partial matching of patterns is allowed. Thus, a confidence value can be computed from a fitness function, providing a measure of the degree of match. A search space given by different combinations of prefixes and suffixes may be very large, leading to a large combinatorial problem. Genetic algorithms have proven to be useful for this kind of problem, because the inherent randomization introduced in each generation allows the algorithm to explore different regions of the variable space, making it resilient to getting caught in local minima. In an embodiment, a genetic algorithm may be used to learn the pattern part of the rules, as discussed in detail below.

Once a rule has been created during the learning phase, it can be applied at extraction time to documents in a production set to extract instances of information of the corresponding type, in other words, the target entities. Generally, this means that each document is fully scanned with the rule being applied to every piece of information. Scanning may be performed by matching the rule pattern to every sequence of terms, for example, words, in a sliding window of the same size as the pattern of the rule. For example, if the target entities were customer names, where customers are companies, a maximum size of five could be set. This assumes that no company has a name with more than five words. A rule would be applied to each phrase of 1, 2, 3, 4, and 5 consecutive words by matching the prefixes and suffixes of the phrase to those in the rule pattern. Accordingly, the number of combinations may grow exponentially, which may be problematic for large production sets. Thus, this technique may be computationally costly. Further, the size of the extraction is unknown beforehand. This means that each sequence of words up to a given maximum size, which is set according to the type of information to be extracted, is a candidate piece of information to be extracted.

To overcome the inefficiency of the above process, some embodiments utilize entity recognizers. An entity recognizer is a piece of code that may recognize entities of a given type from text. Entity recognizers may recognize and mark dates, company names, countries, addresses, phone numbers, zip codes, people names, and the like, in a document. In an embodiment, an entity recognizer first marks entities in a document by their entity type. For example, if the target entity is a customer, an entity recognizer may be run on the training corpus and test documents to identify words of type "people name" or "company name."

At extraction time, the entity recognizer may first mark all the pieces of information in the target documents of the production set that belong to that entity type, and then the rule patterns can be applied to the context, i.e., the neighboring words, of the instances identified by the entity recognizer. For the example of extracting customers, there may be person names throughout a document, but only one of them may correspond to a customer name. Thus, a rule to extract customers will only apply to the context of those entities already recognized as names by a name recognizer. This method can dramatically reduce the complexity of the extraction task, by limiting it to only the potentially relevant pieces of information, while increasing the accuracy by applying the rules only to entities of the appropriate type.

Rule Generation

Figure 2:
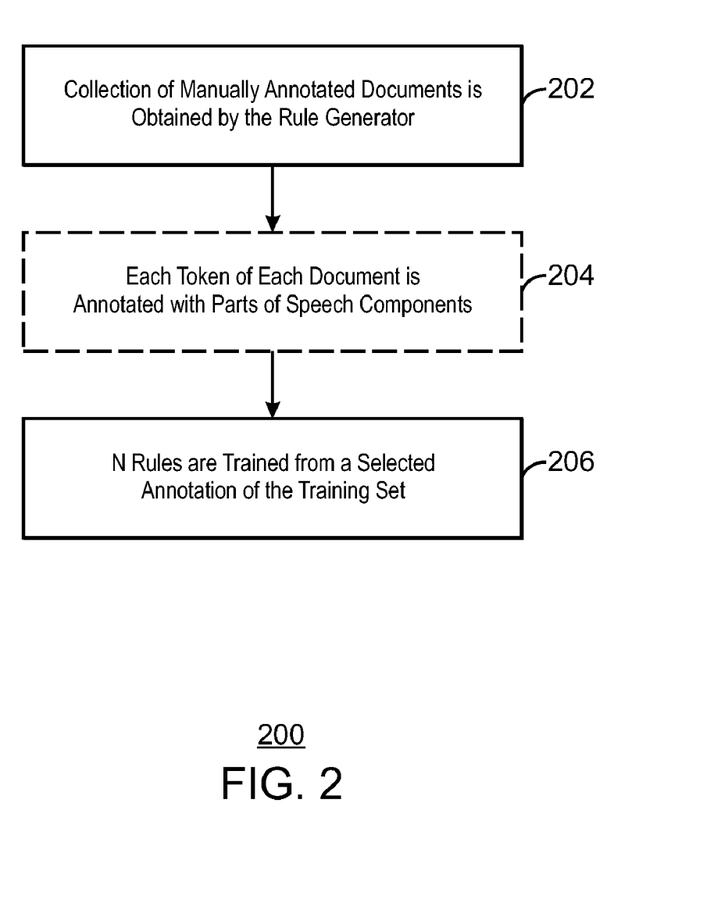
FIG. 2 is a block diagram of a method for discovering rules that may be useful for an information extraction, in accordance with an embodiment.

FIG. 2 is a block diagram of a method 200 for discovering rules that may be useful for an information extraction, in accordance with an embodiment. As used herein, a rule is a pattern given by terms that appear before (prefixes) and after (suffixes) an instance of information, i.e., a target entity. The method 200 starts at block 202, at which a set of training documents, or corpus, is obtained by the rule generator. The training set is used to develop the model, for example, the rules, that can be used to extract the relevant pieces of information from a production set of documents. Thus, in the training set, annotations can be made manually in each of the documents to mark the target entity. The result is a training corpus that includes a set of tagged documents. As an example, if the documents are contracts and the target entity is an expiration date for a contract, the date is manually tagged in the documents of the training corpus. This may generate an exemplary text sequence of " . . . text . . . <exp_date> Sep. 15, 2000</exp_date> . . . text" in one of the documents.

At block 204, the words, or tokens, in the training documents may be annotated with a part-of-speech tag. Marking words in a document with a part-of-speech (PoS) tag may often improve the accuracy of an information extraction (IE) model. In corpus linguistics, PoS tagging may also be called grammatical tagging or word-category disambiguation. PoS tagging is the process of marking words in a text as corresponding to a particular part of speech, for example, nouns, verbs, etc., based on the definition and the context. In some embodiments, PoS tagging may be used to tag the training set so that the patterns learned include the prefixes and suffixes along with their PoS tags. However, the techniques are not limited to the use of PoS tagging. For each IE task it can be tested to see if PoS tagging helps or not. If used during training, the same PoS tagger is also used to tag the production set, i.e., the documents of interest, since patterns will be matched not only to the suffixes and prefixes but also their PoS tags.

At block 206, a number of rules can be generated from the annotated training set, for example, using a genetic algorithm. As used herein, a genetic algorithm (GA) is a heuristic search technique that may used to find a solution to optimization in search problems by simulating the behavior of biological evolution. It works by producing populations that include a number of individuals. The individuals are processed in a sequence of generations where only the fittest individuals survive in each generation, for example, as determined by a fitness function. A population evolves by eliminating the less fit individuals and recombining the most fit individuals to create new individuals for the next generation. At the end of this iterative process, the fittest individual represents a solution. The number of iterations, or generations, N is a user defined parameter. The use of the genetic algorithm is discussed further with respect to FIG. 3.

Figure 3:
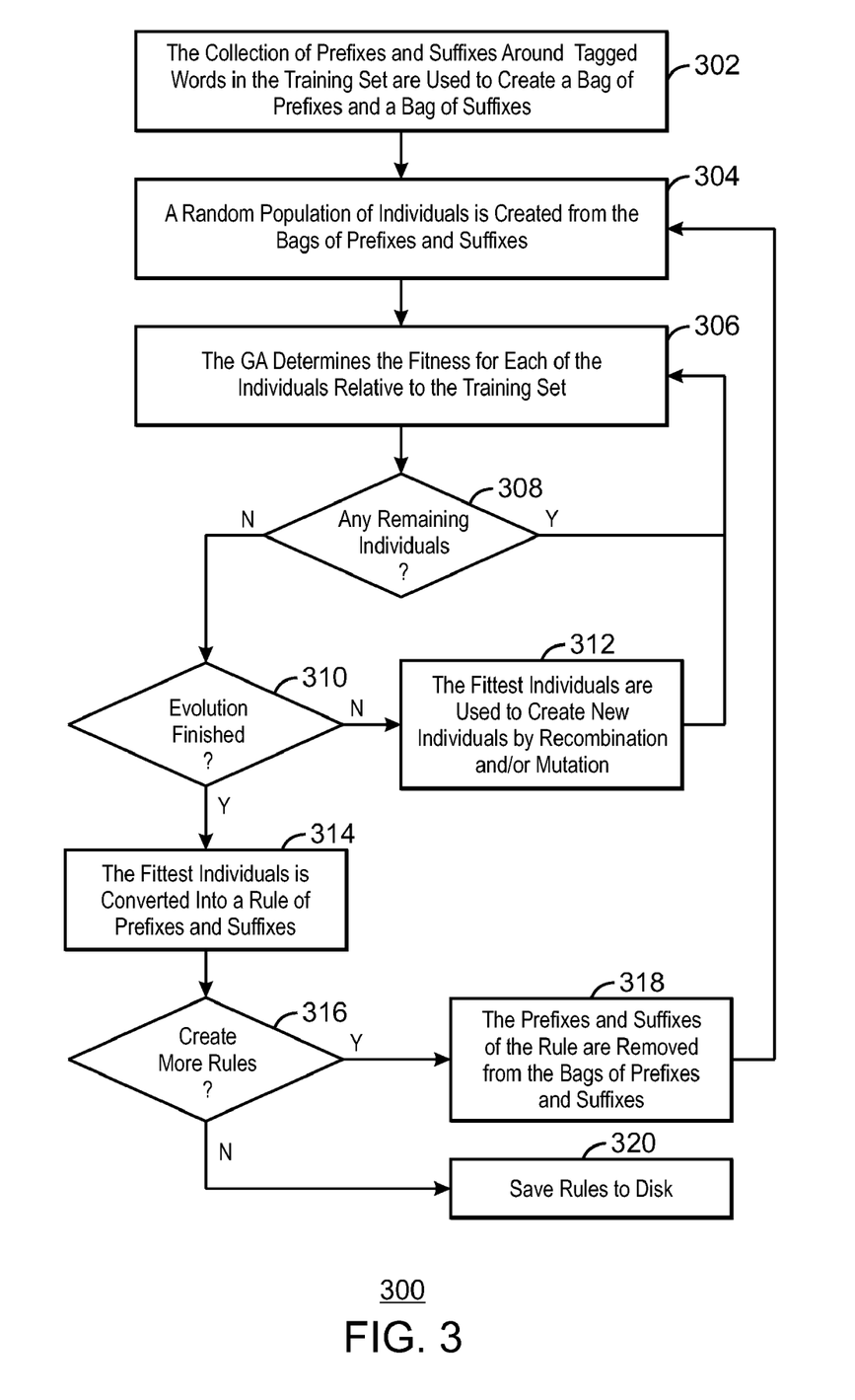
FIG. 3 is a block diagram of method for discovering rules using a genetic algorithm, in accordance with an embodiment.

FIG. 3 is a block diagram of method 300 for discovering rules using a genetic algorithm, in accordance with an embodiment. The method 300 begins at block 302, at which bags of words representing prefixes and suffixes can be collected from the training set by inspecting the prefixes and suffixes of manually tagged instances of a given type. This may include the PoS tags, if used. As used herein, a bag of words is a collection or list of words that have a commonality, for example, being within a certain number of words before (prefixes) or after a target entity (suffixes). In some embodiments, filters may be applied to the bag-of-words to remove common words, such as "a," and "the."

In some embodiments, all of the unique prefixes and suffixes from each tagged instance on the training set are collected into a bag of prefixes and a bag of suffixes respectively. The context for determining the prefixes and the suffixes is set by a window whose size is set by a parameter. In various embodiments, the parameter may be 15, 10, 5, 2, or even 1. For example, if the parameter is 10, then the 10 terms before a tagged word are added to the bag of prefixes and the 10 terms after the tagged word are added to the bag of suffixes.

At block 304, a genetic algorithm is started by creating a population of individuals from random combinations of words taken from the bag of prefixes and the bag of suffixes. The design of the individual is an important part of a genetic algorithm as the methods of the algorithm are based on the design. Each individual is made of genes which in practice correspond to the features used to learn a model. In various embodiments, the individual can be composed of two parts, an n-length prefix and an n-length suffix. These can be randomly generated from the bags of prefixes and suffixes respectively.

As an example, the bag of prefixes may include the terms A, B, C, D, and E, and the bag of suffixes may include the terms F, G, H, I, and J. If the parameter is set to three, then three words may be selected from the bag of prefixes and three words may be selected from the bag of suffixes to create an individual. For example, some of the individuals in the population may be represented by ADE-GHI, in which ADE is the 3-length prefix of an individual and GHI is the 3-length suffix. Another example of an individual may be BCD—HIJ, and many others could be formed from the bag of words. During each iteration, or generation, of a genetic algorithm, a set of processes are performed on the individuals to create a stronger or fitter population, selection, cross-over, and mutation.

At block 306, the genetic algorithm determines a fitness score, e.g., a value from a fitness function, for each individual to select the fittest individuals. The value of the fitness function can be determined in a number of ways, each of which may be tested to determine which works better for a given information extraction task.

In some embodiments, the fitness function may be a function that is based on the number of matches of the individual prefixes and suffixes with those of the tagged instances in the training set. More matches results in a higher fitness score, representing a fitter individual. This is the simplest version where the fitness function is the sum of all of the matches, and the number of prefixes and suffixes to constitute the pattern of the rule is fixed by a parameter defined by the user. For example, if the window is set to 10, then an individual will always have 10 prefixes and 10 suffixes. However, forcing a fixed number of suffixes or prefixes may create noisy patterns where only some of the prefixes and suffixes are relevant, but others have to be included to meet the required number. Likewise, if a small number is given as the window size, some important words that are part of a relevant pattern may be left out. In consequence, those rules will have low accuracy. However, not every word position (gene) in the individual must be populated.

In some embodiments, individuals may be created that have a blank word in a gene. Thus, some individuals in the population may be represented by AC(blank)—GHI or ABE—(blank)IJ, among others. As the empty string in an individual implies the absence of a term, it can be matched with any of the terms in the context of the tagged instance. The fitness function may take in consideration the empty string, as such a match has less value (empty_string_value parameter) than a match to a non-empty string. Therefore, any individual that has more matches with its non-empty strings has a higher fitness value than another individual with more matches on its empty strings.

For example, if an individual has one non-empty string match and eight empty strings matches then the fitness function will be 1+(empty_string_value)*8. In various embodiments, this value will not be greater than another individual with more than one non-empty string matches. Thus, in this version of the fitness function, the number of prefixes and suffixes for an individual could be any number from zero to the maximum number allowed, as set by the size of the context window. Accordingly, the empty string may be added to the suffix and prefix bags as another word. This version of the algorithms tends to produce more individuals with only relevant words.

It can be noted that the order of the words/terms on the individuals is not taken into consideration in the previous versions. Therefore, as long as the prefixes and suffixes of an individual appear in a context window, e.g., within the number of terms before or after the target entity, they are considered good matches. For example, the prefixes "and," and "between" in an individual can occur anywhere in a prefix context window to count as matches. In some IE tasks, where the terms follow an order of appearance in a regular way, it is important to make the order matter to obtain better rules. In this case, the individuals will be more constrained in the matching.

In some embodiments, the fitness function can be modified to match terms only if they appear in the appropriate order indicated by the internally ordered individuals. It can be noted that this imposes a relative order between the terms but not an exact position. For example, an individual with prefixes "and," "between," and "parties" constrains the words in a context window to appear in such an order but not necessarily consecutively. Other words may appear between these terms as long as they are inside of the prefix window.

At block 308, a determination is made as to whether any individuals remain for which a fitness value has not been determined. If there are any remaining individuals, process flow returns to block 306 to continue the calculation. If a fitness value has been determined for all individuals, process flow proceeds to block 310.

At block 310, a determination is made as to whether the evolutionary process is finished, or should be continued through succeeding generations. This may be performed to increase the probability of exploring more regions in the search space and, therefore, increase the chance of finding a global optimal. The determination may be performed in a number of ways. In one embodiment, so long as individuals whose fitness score exceeds a given threshold T1 are obtained and the score of the fittest individual in the current generation improves with respect to the previous generation, the evolutionary process is continued since there may still be more highly fitted individuals. In other embodiments, the evolution may be performed for a set number of generations.

If the evolutionary process is not finished at block 310, process flow proceeds to block 312. At block 312, the fittest individuals (those having the highest scores on the fitness functions) are used to create a new set of individuals by recombination and mutation. This can be performed by using a pre-selected parameter that determines the percentage of fittest individuals to use, for example, the top 50% of individuals, the top 25%, the top 15%, the top 10%, the top 5%, the top 1%, or any other appropriate percentage, based on the total number of individuals created at each generation, the amount of computing power available, and the speed at which convergence is likely to occur. For example, a problem that converges quickly may only need a low percent of the highest scoring individuals maintained between each generation.

Once the fittest individuals are selected, their genes may be recombined to form a new population of individuals, which may or may not include the original individuals. The recombination may be performed using any number of strategies. For example, words from parent individual's prefix may be randomly mixed with words from the prefixes of one or more other parent individuals to form a prefix for a child individual. The process may be repeated for the suffixes of the parent individuals to create the suffix for the child individual.

Mutations may be introduced by replacing one word randomly selected from the prefixes and suffices of a newly created individual with a word randomly selected from the bags of prefixes and suffixes. Mutations may increase the probability that the genetic algorithm will reach a global minimum, and not be trapped in a local minimum. However, the number of mutations can be limited to a percentage of the number of individuals to ensure that the genetic material of some of the fittest individuals is preserved throughout generations.

Mutation may also delay the convergence time so that more solutions, and, potentially, the fittest individuals, are found. In embodiments that have several thousand words, the percentage of mutated individuals may be set to about 70%, about 90%, or higher, to increase the chance of considering all the possible words in the bags of prefixes and suffixes. In embodiments that have only a few words, the percentage may be set much lower, for example, about 20%, about 10% or lower. Once new individuals are created, process flow returns to block 306 to determine fitness functions for the new individuals.

If the evolution is determined to be finished at block 310, process flow proceeds to block 314, at which the fittest individual, i.e., the individual with the highest score for the fitness function, is converted into a pattern of prefixes and suffixes that forms a new rule. In particular, the prefixes and suffixes from the individual constitute the conditional part of the rule. In some embodiments, the rule may also include a restriction on the order of words. Empty strings, used as wildcard locations, may be ignored, because they were only used to allow for patterns with different lengths using individuals of the same length.

At block 316 if a determination is made to create more new rules, process flow proceeds to block 318. At block 318, the terms or words of the new rule are removed from the bags of prefixes and suffixes so that they are no longer used. Process flow then proceeds to block 304 to repeat the process using the more limited set of prefixes and suffixes. At the end of each repetition, the fittest individual may be used to generate an additional new rule, which applies to instances whose context follows a different pattern. In subsequent repetitions, at block 316, the decision to create another new rule may be positive so long as the score of the fittest individual exceeds a threshold T2. As for T1, T2 may be set by experimentation. However, in some embodiments as long as rules with a fitness score greater or equal to about 0.1, e.g., about 10% better than pure random selection, are obtained, the process may continue to search more rules. It will be noted that a rule may not have a score of one, as that would indicate that it has extracted all of the tagged entities of the corresponding role-type. In turns this would imply that the context, for example, the neighboring words, is very regular, in other words, has no variability. This situation may be unlikely since the words surrounding the entities usually present variations.

T2 may often be lower than T1, since it is expected that as the process is repeated and words are eliminated, the new individuals will probabilistically apply to less cases. At block 316, if it is determined that the fitness individual has a fitness value less than the threshold, T2, process flow continues to block 320, at which the rules are saved to disk.

Rules learned during the training phase can be validated during a testing phase, where they are applied to a tagged testing set that was not included in the training set or corpus. The accuracy of each rule can be measured in terms of its "precision," which can be defined as the number of correct extractions from all the extractions that it did. A threshold, termed T3, may be set so that only those rules that match or exceed it are accepted. If the threshold is set to 1 it means that 100% of the extractions are correct. However, depending on the application, there could be some tolerance for some incorrect extractions, in this case T3 should be set to a lower value, such as about 75%, 80%, 90%, or any other value that reflects the tolerance to incorrect extractions.

In one embodiment, validation may be performed using a metric termed "recall." "Recall" can be defined as the number of correct extractions done over the total number of extractions that may be performed in a validation test set. For example, if a validation test set was known to have ten expiration dates, but only five were extracted, the recall would be 5/10 or 0.5. Accordingly, an "accuracy" metric may be generated as a harmonic mean of precision and recall, herein termed an F measure. The F-measure may be calculated as:

$$F = 2 \cdot \frac{\text{precision} \cdot \text{recall}}{\text{precision} + \text{recall}}.$$

A high level view, or pseudo-code representation, of an algorithm that may be used to implement the method 300 is presented below:

```
Procedure LearnRules ( numberOfRules, numberOfEvolutions)
    //obtains the terms within a context window for all the annotations in
    the training set//
    PrefixesBag = Training Set → Obtain unique prefixes ( )
    SuffixesBag = Training Set → Obtain unique suffixes ( )
    Generic Algorithm → StartPopulation (PrefixesBag, SuffixesBag)
    Loop C: While there are new rules with accuracy > T_2 do
        Loop B: While there are new individuals with score > T_1 do
            Loop A: For 1 to numberOfEvolutions
                GA→ evolve( )
            End Loop A
            Fittest Individual[i++] = GA→ Get best Individual( )
        End Loop B
        //Convert to rule//
        j = Choose fittest individual with highest score
        Rules List → Add (Fittest Individual[j] )
        //remove from the bags the prefixes and suffixes of the fittest
        individual//
        Prefixes Bag → remove( Fittest Individual → Get Prefixes ( ) )
        Suffixes Bag→ remove( Fittest Individual → Get Suffixes( ) )
    End Loop C
    return Rule List
End Procedure
Procedure StartPopulation( PrefixesBag, SuffixesBag)
    For i from 1 to numberOfIndividuals
        For j from 1 to windowSize
            A = Random( Size ( PrefixesBag) )
            Population[i] → SetPrefix (j, PrefixesBag → get ( A ) )
            B = Random( Size ( SuffixesBag) )
            Population[I] → SetSuffix (j, SuffixesBag → get ( B ) )
End Procedure
```

Information Extraction

Figure 4:
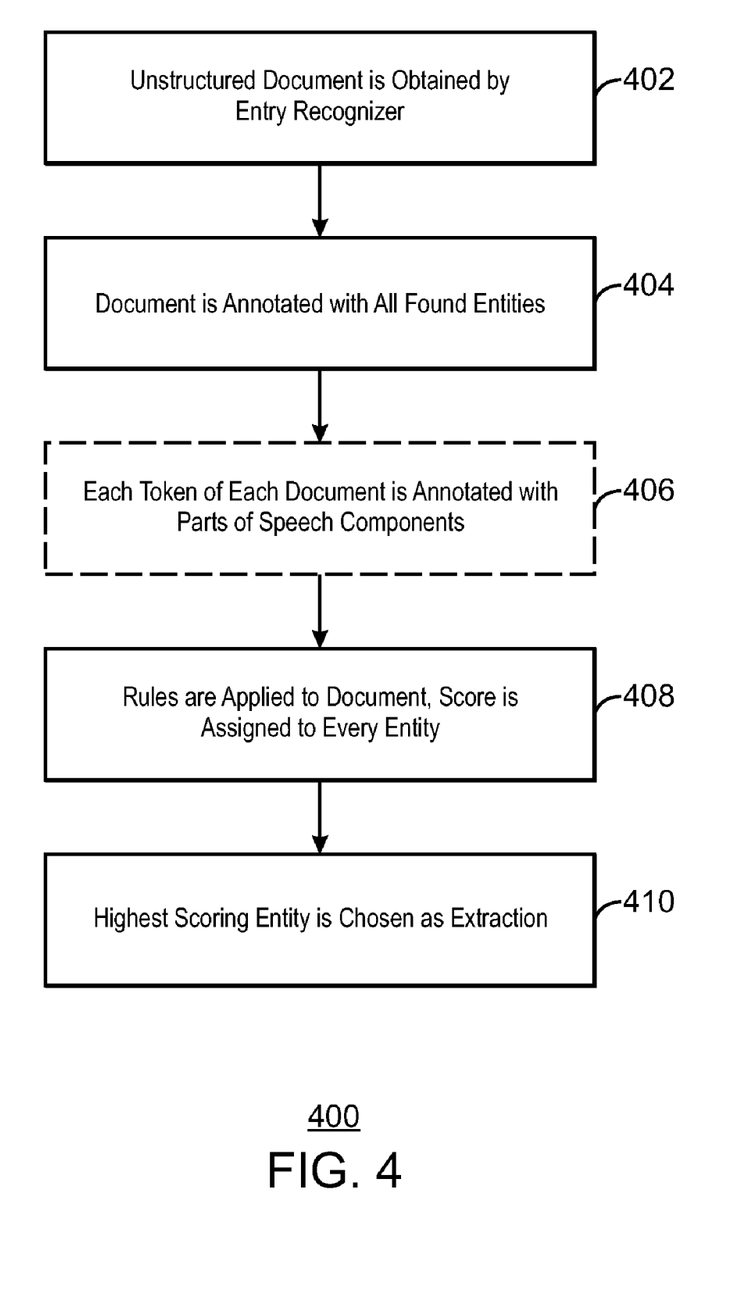
FIG. 4 is a block diagram of a method that uses the rules developed above for information extraction, in accordance with an embodiment.

FIG. 4 is a block diagram of a method 400 that uses the rules developed above for information extraction from an unstructured document, in accordance with an embodiment. The method 400 starts at block 402, when an unstructured document is obtained by an entity recognizer. As discussed herein, the rules can be applied to every document of a production set, but may only be applied to the context of those entities that are already tagged by the appropriate entity recognizer. This enables a focused application of the extraction rules to the potentially relevant parts of the document in contrast to searching the entire document. An entity recognizer may be selected based on the type of information desired. For example, to extract companies that are customers, an entity recognizer for organizations is used to annotate every organization found in a document.

Once entities have been tagged by the recognizer at block 404, at block 406 a PoS tagger may be used to tag each token with the parts of speech for the recognized entities. This function is only performed if it was performed during the rule generation, discussed with respect to FIG. 2.

At block 408, the previously learned rules are applied to each of the annotated entities in the document. A score or confidence value is computed for each annotated entity according to the number of word matched with the rule. As noted herein, the matches may be to any sequence of words in the prefix or suffix, or may be to words in a specific order. At block 410, the entities with the highest confidence value are extracted, or marked, along with their scores. In embodiments in which a target entity occurs only once in the document, the extraction can be set to extract only the entity with the highest confidence value, rather than a plurality of target entities.

It will be noted that a rule pattern doesn't need to be matched fully since partial matches may be allowed. In one embodiment, a confidence value may be computed from the number of matches and the accuracy of the rule is associated with each extraction. Only those entities whose confidence value exceeds a given threshold can be considered for extraction.

A high level view or pseudo-code of an algorithm that may be used to implement the method 400 is presented below:

```
Procedure Extraction
    Annotated Document = recognizer → recognize(input Document)
    For each Annotation in the Annotated Document
        For each Rule in the RulesSet
            Learned Rule → Assign Score (Annotation)
    //the higher scoring annotation is chosen to be the extraction
    Extraction = Maximum Score( Document Annotations );
    Return Extraction
```

Non-Transitory Machine Readable Medium

Figure 5:
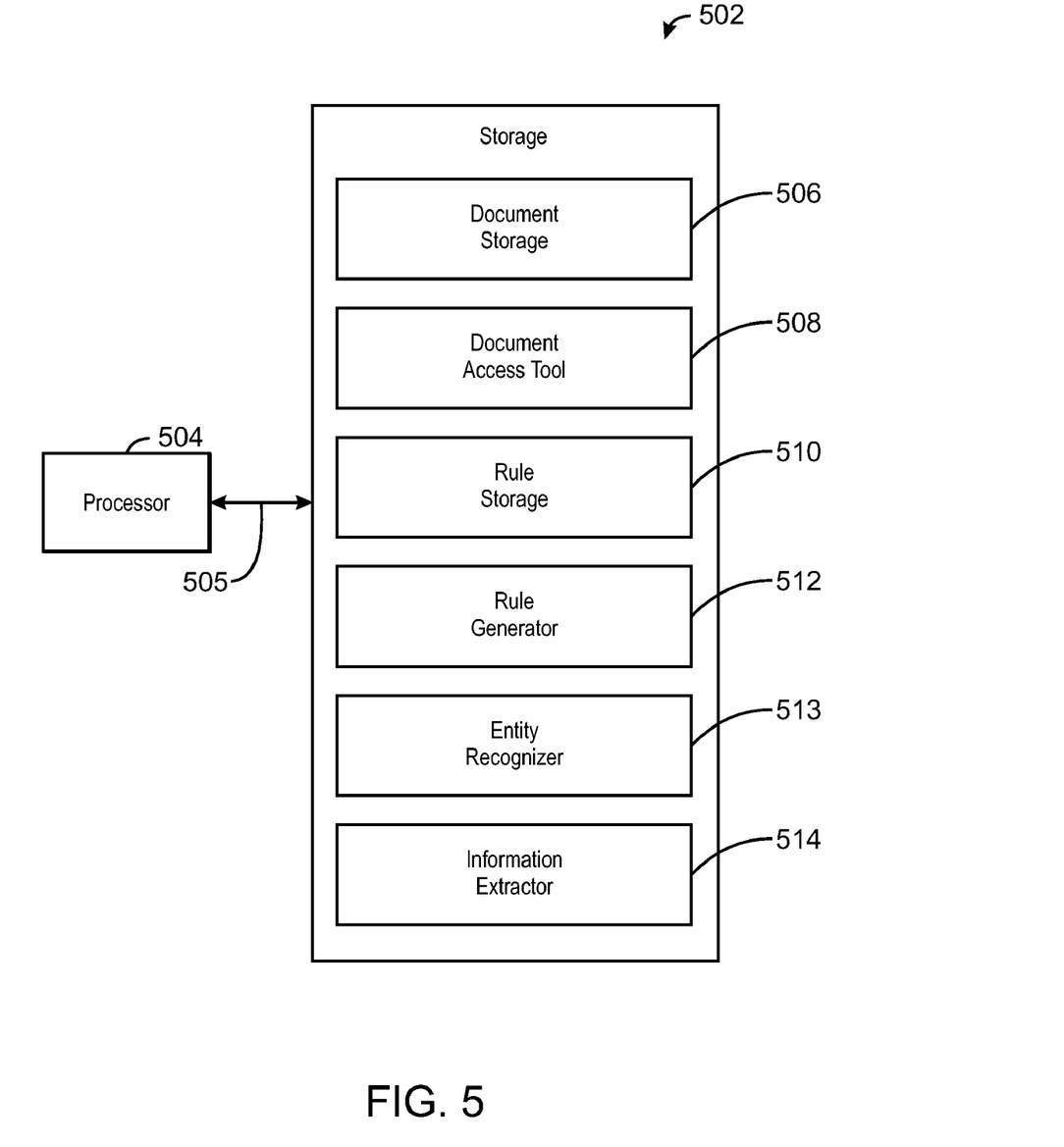
FIG. 5 is a block diagram of a non-transitory computer readable medium that includes code modules to implement an information extraction, in accordance with an embodiment.

FIG. 5 is a non-transitory computer readable medium 502 containing code modules configured to direct a processor 504 to implement methods for extracting information from unstructured documents, in accordance with an embodiment. The non-transitory computer readable medium 502 may include a hard drive, a memory, an optical drive, a RAM drive, or any combinations thereof. The processor 504 may be a single core processor, a multi-core processor, or a cluster of processors in a cloud computing configuration. The processor 504 may access the non-transitory computer readable medium 502 over a bus 505, which may include a PCI, PCIe, or any other suitable communications path, including, for example, an Ethernet connection. The non-transitory computer readable medium 502 may hold data structures representing unstructured documents 506, including both training documents and target documents. A document access tool 508 may be used to access target documents, such as over a network connection, as discussed herein. A data structure may hold a set of rules 510. The rules may be generated by a rule generator 512, for example, using the techniques discussed with respect to FIGS. 2 and 3. An entity recognizer 513 may be used to identify base entities such as corporations, dates, timeframes, and the like as discussed herein. Once the rules 510 have been generated by the rule generator 512, they may be used by the information extractor 514 to extract target role-based entities from unstructured documents, using the techniques discussed with respect to FIG. 4. It will be clear that the techniques are not limited to the modules described above. Any arrangement of modules or code that performs the same functions may be used.

EXAMPLE

Using the techniques described above, three information extraction experiments were performed on a set of 52 unstructured contracts. The experiments included recognizing the customer of the contract (customer), the date in which the contract is made effective (effective date), and the period it gives to provide notice before termination (termination notice period).

In the experiments in which the target entities were customer, expiration date and termination notice period from a contracts collection, the entity recognizers were configured to recognize organizations, dates, and time periods, respectively. For example, for the dates and time periods, regular expression based recognizers were created which embodied several forms of formatted date and time periods. For the organization type, different recognizers were tested, including the Stanford open source classifier, the Open Calais web service, and the General Architecture for Text Engineering (GATE). It will be understood that these were merely examples of systems that can be used, and that the techniques are not limited to any of these recognizers, or, indeed, any currently existing recognizer.

A random sub-sampling was made using a 10-fold cross validation wherein 90% of the documents were used for training, for example, generating the rules, and 10% of the documents reserved for a validation set. The genetic algorithm test allowed empty strings to be present in the prefixes and suffixes during creation of the rules. The validation set was formed from four documents. Not all of the documents from the collection of contracts contained an effective date. However, the lack of an effective date in a particular contract does not affect the results. The validation is performed on the tagged documents and those documents that do not have an effective date are not tagged. The results would only be affected if an extractor/recognizer extracted an effective date from a document that does not have an effective date, in other words, generating a "false positive" result.

The results for identifying effective dates are shown in Table 1. The results for identifying termination notice periods are shown in Table 2. In each of these tables, the results are presented as the number of correct extractions/number of documents. From the results shown in Table 1, an average accuracy of 85% was obtained for identifying effective date. Similarly, for the results shown in Table 2, an average accuracy of 78% was obtained for identifying termination notice periods.

TABLE 1

Accuracy of identifying effective date in a contract

| FOLD | 1 | 2 | 3 | 4 | 5 | 6 | 7 | 8 | 9 | 10 |
|---|---|---|---|---|---|---|---|---|---|---|
| RESULT | 4/4 | 4/4 | 4/4 | 4/4 | 3/4 | 3/4 | 3/4 | 3/4 | 3/4 | 3/4 |
| ACCURACY (%) | 100 | 100 | 100 | 100 | 75 | 75 | 75 | 75 | 75 | 75 |

TABLE 2

Accuracy of determining termination notice period

| FOLD | 1 | 2 | 3 | 4 | 5 | 6 | 7 | 8 | 9 | 10 |
|---|---|---|---|---|---|---|---|---|---|---|
| RESULT | 3/3 | 3/3 | 2/3 | 2/3 | 1/3 | 2/3 | 3/3 | 2/3 | 3/3 | 3/3 |
| ACCURACY (%) | 100 | 100 | 67 | 67 | 33 | 67 | 100 | 67 | 100 | 100 |

Table 3 shows the results obtained for extraction of a customer name. For this experiment, a Stanford classifier was used as a recognizer. The classifiers were trained using sample documents annotated with different entities. The experiment was performed using a 10% testing set. In other words, 10% of the documents were retained for the testing phase in each fold, and were not used for training purposes.

Accuracy of identifying customers

| FOLD | 1 | 2 | 3 | 4 | 5 | 6 | 7 | 8 | 9 | 10 |
|---|---|---|---|---|---|---|---|---|---|---|
| RESULT | 0/4 | 2/4 | 2/4 | 3/4 | 2/4 | 2/4 | 1/4 | 1/4 | 2/4 | 2/4 |
| ACCURACY (%) | 0% | 50% | 50% | 75% | 50% | 50% | 25% | 25% | 50% | 50% |

The results for the third experiment were not as good as those obtained in the previous tests, yielding an average accuracy of 42.5%. Many of the wrong extractions extracted the vendor on the contract, and not the customer. Since a contract is made between two organizations, and the context for each was similar, the rule did not always determine which one was the customer. The example above was run on a very small (52 runs). Larger test sets may have thousands of documents and, thus, are likely to have a higher statistical validity. Thus larger test sets are expected to have better results than those shown in Tables 1-3.

What is claimed is:

1. A system for extracting data, comprising:
a processor;
a storage system, comprising:
an unstructured document;
a rule comprising a plurality of prefixes for a target entity and a plurality of suffixes for the target entity, and
code configured to direct the processor to:
perform an entity recognition on the unstructured document to mark entities by type;
apply the rule to marked entities; and
generate a confidence value for each of the marked entities, where the confidence value indicates a degree of match to the rule.

2. The system of claim 1, comprising code configured to direct the processor to select the entity with a highest confidence value as an extraction target.

3. The system of claim 1, comprising code configured to direct the processor to annotate each token of the unstructured document with a parts-of-speech tag.

4. The system of claim 3, wherein the memory comprises code configured to direct the processor to direct the processor to annotate each token of the unstructured document with a parts-of-speech tag.

5. The system of claim 1, wherein the memory comprises code configured to direct the processor to:

obtain a plurality of training documents, wherein an entity of interest is marked in each of the plurality of training documents;
generate a plurality of prefixes for the entity of interest;
generate a plurality of suffixes for the entity of interest;
create a plurality of individuals, wherein each of the plurality of individuals comprises a sequence of prefix words and a sequence of suffix words;
apply each of the plurality of individuals to each of the plurality of training documents to generate a fitness score associated with each of the plurality of individuals; and
convert an individual having the highest fitness score into a new rule.

6. The system of claim 5, comprising code configured to direct the processor to annotate each token of each of the plurality of training documents with a parts-of-speech tag.

7. The system of claim 5, wherein the storage system comprises code configured to direct the processor to:
evolve the plurality of individuals for a preselected number of generations; and
convert an individual rule having the highest fitness score into a rule.

8. The system of claim 7, wherein the memory comprises code configured to direct the processor to:
remove suffixes associated with the rule from the plurality of suffixes;
remove prefixes associated with the rule from the plurality of prefixes;
generate a new plurality of individuals;
apply each of the new plurality of individuals to each of the plurality of documents to generate a fitness score associated with each of the new plurality of individuals;
evolve the new plurality of individuals for a preselected number of generations; and convert an individual in the new plurality of individuals having the highest fitness score into a new rule.

9. The system of claim 5, wherein evolving the plurality of individuals comprises:
calculating a fitness score for each individual in a population;
identifying a subset of individuals having a fitness score above a threshold;
discarding all of the individuals having fitness scores less than the threshold; and
recombining the individuals to form a new generation of individuals.

10. The system of claim 9, wherein the threshold is selected to eliminate a portion of individuals from the population.

11. The system of claim 9, wherein recombining the individuals comprises randomly selecting prefixes and suffixes from at least two individuals to create a new individual.

12. The system of claim 1, comprising a network interface, wherein the storage system comprises code configured to direct the processor to obtain an unstructured document through the network interface.

13. The system of claim 1, comprising a display, wherein the storage system comprises code configured to direct the processor to display an unstructured document, wherein the entities and extraction targets of the unstructured document are marked.

14. A method of extracting a target entity from a document, comprising:
performing an entity recognition on an unstructured document in a database to create found entities;
annotating the found entities in the unstructured document, wherein annotating comprises inserting tags around the found entities to generate marked entities;
applying a rule to each of the marked entities in the unstructured document to generate a confidence value for every entity, wherein the rule comprises a plurality of prefixes for a target entity and a plurality of suffixes for the target entity; and
selecting a marked entity with the highest confidence value as an extraction target.

15. The method of claim 14, comprising generating the rule through the application of a genetic algorithm to a plurality of training documents.

16. The method of claim 15, comprising annotating each token of the plurality of training documents and the unstructured document with a parts-of-speech tag.

17. The method of claim 15, comprising generating additional rules by:
removing suffixes associated with the rule from a plurality of suffixes;
removing prefixes associated with the rule from a plurality of prefixes;
generating a new plurality of individuals;
applying each of the new plurality of individuals to each of the plurality of training documents to generate a fitness score associated with each of the new plurality of individuals;
evolve the new plurality of individuals for a preselected number of generations; and
convert an individual in the new plurality of individuals having the highest fitness score into a new rule.

18. A non-transitory, computer readable medium comprising code configured to direct a processor to:
load an unstructured document into a memory;
perform an entity recognition on the unstructured document;
annotate entities recognized in the unstructured document to generate marked entities;
apply a rule to the marked entities to generate a confidence value for every marked entity, wherein the rule comprises a plurality of prefixes for a target entity and a plurality of suffixes for the target entity; and
select the marked entity with a highest confidence value as an extraction target.

19. The non-transitory computer readable medium of claim 18, comprising code configured to direct the processor to:
obtain a plurality of training documents, wherein an entity of interest is marked in each of the plurality of training documents;
generate a bag of words of prefixes for the entity of interest;
generate a bag of words of suffixes for the entity of interest;
create a plurality of individuals, wherein each of the plurality of individuals comprises a plurality of prefix words selected the bag of words of prefixes and a plurality of suffix words selected from the bag of words of suffixes;
apply each of the plurality of individuals to each of the plurality of training documents to generate a fitness score associated with each of the plurality of individuals; and
convert an individual having the highest fitness score into a new rule.

20. The non-transitory computer readable medium of claim 19, comprising code configured to direct the processor to:
remove suffixes associated with the rule from the bag of words of prefixes;
remove prefixes associated with the rule from the bag of words of suffixes;
generate a new plurality of individuals by selecting a plurality of prefix words from the bag of words of prefixes and selecting a plurality of suffix words from the bag of words of suffixes;
apply each of the new plurality of individuals to each of the plurality of documents to generate a fitness score for each of the new plurality of individuals;
evolve the new plurality of individuals for a preselected number of generations; and
convert an individual in the new plurality of individuals having the highest fitness score into a new rule.

* * * * *

UNITED STATES PATENT AND TRADEMARK OFFICE
CERTIFICATE OF CORRECTION

PATENT NO. : 8,239,349 B2  
APPLICATION NO. : 12/900133  
DATED : August 7, 2012  
INVENTOR(S) : Maria G. Castellanos et al.

Page 1 of 1

It is certified that error appears in the above-identified patent and that said Letters Patent is hereby corrected as shown below:

In column 12, line 5, in Claim 4, after "configured" delete "to direct the processor".

In column 14, line 28, in Claim 19, delete "selected" and insert -- selected from --, therefor.

Signed and Sealed this
Fifth Day of February, 2013

Teresa Stanek Rea
*Acting Director of the United States Patent and Trademark Office*